US011012271B2

(12) United States Patent
Venca et al.

(10) Patent No.: US 11,012,271 B2
(45) Date of Patent: May 18, 2021

(54) DEMODULATOR FOR AN RFID CIRCUIT (71) Applicant: EM Microelectronic-Marin SA, Marin (CH)

(72) Inventors: Alessandro Venca, Hauterive (CH); Michel Moser, Steffisburg (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 16/410,304

(22) Filed: May 13, 2019

(65) Prior Publication Data

US 2019/0372808 A1    Dec. 5, 2019

(30) Foreign Application Priority Data

Jun. 5, 2018 (EP) ..................... 18175997

(51) Int. Cl.
    *H04L 27/06*     (2006.01)
    *H04B 5/00*     (2006.01)
    *G06K 19/07*     (2006.01)

(52) U.S. Cl.
CPC .......... *H04L 27/06* (2013.01); *G06K 19/0723* (2013.01); *H04B 5/0031* (2013.01)

(58) Field of Classification Search
CPC .. H04B 5/0031; H04B 5/0062; H04B 5/0075; H04B 5/00; G06K 19/0723; G06K 7/0008; H04L 2025/03477; H04L 25/03127; H04L 25/03133; H04L 27/06
USPC ...................... 455/337, 41.1; 340/10.1, 10.42
See application file for complete search history.

(56) References Cited

U.S. PATENT DOCUMENTS

| 2010/0079261 A1* | 4/2010 | Goto ................... H04B 5/0075 340/10.51 |
| 2014/0080412 A1 | 3/2014 | Kang et al. |
| 2016/0149736 A1 | 5/2016 | Dasgupta |

FOREIGN PATENT DOCUMENTS

EP     3 024 187 A1     5/2016

OTHER PUBLICATIONS

European Search Report dated Nov. 28, 2018 in European Application 18175997.8, filed on Jun. 5, 2018 (with Written Opinion).
Hyongmin Lee, et al. "Differentiating ASK Demodulator for Contactless Smart Cards Supporting VHBR," IEEE Transactions on Circuits and Systems II: Express Briefs, IEEE, US, vol. 62, No. 7, Jul. 1, 2015, XP011585935, ISSN:1549-7747, DOI:10.1109/TCSII.2015.2415653, 5 pages.
Japanese Office Action dated Aug. 25, 2020 in corresponding Application No. 2019-103548 (filed on Jun. 3, 2019).
Shuenn-Yuh Lee, et al. "Wireless energy-harvesting circuit and system with error-correction ASK demodulator for body sensor network with ultra-high-frequency RFID healthcare system," IET Wireless Sensor Systems, IEEE, US, vol. 8. No. 1, Jan. 29, 2018, ISSN: 2043-6386, DOI: 10.1049/IET.WSS.2017.0082, 9 pages.

* cited by examiner

Primary Examiner — Philip Sobutka
(74) Attorney, Agent, or Firm — Oblon, McClelland, Maier & Neustadt, L.L.P.

(57) ABSTRACT

An RFID circuit and to a demodulator for an RFID circuit, the demodulator including an input and at least one output, a clock extractor connected to the input, a comparator connected to at least one output, a finite impulse response FIR filter arrangement connected to the input and connected to the comparator.

16 Claims, 5 Drawing Sheets

DEMODULATOR FOR AN RFID CIRCUIT

CROSS-REFERENCE TO RELATED APPLICATION

This application claims priority to European Patent Application No. 18175997.8 filed on Jun. 5, 2018, the entire disclosure of which is hereby incorporated herein by reference.

FIELD OF THE INVENTION

The present invention relates to the field of RFID tags and in particular to a transponder front-end of an RFID tag. In one aspect the invention relates to a demodulator for an RFID circuit.

BACKGROUND

The invention generally relates to systems of radio-frequency-identification (RFID) usually consisting of sets of two kinds of devices, the first one named reader or transceiver, the second one named tag or transponder, that are able to communicate with the respective other kind of device through an electromagnetic field or wave.

The communication for transmitting information from a reader to a tag is called downlink, the communication of information in the opposite direction is called uplink. A tag capable of uplink only is qualified as read-only. In order to be able to communicate in uplink or downlink a tag needs to be supplied with electric energy that may be transferred from the reader to the tag via the electromagnetic field or wave or be provided by some source of electric energy innate to the tag such as e.g. a battery. In the former case, the tag is qualified as passive. In case a passive tag is intended to communicate in uplink with a reader while, at the same time, the reader transfers the electric energy required for the operation of the tag via the electromagnetic field or wave that carries also the information being communicated, the RFID-system is qualified to be full-duplex (FDX).

In case transfer of information in uplink and transfer of electric energy via the electromagnetic field or wave are not simultaneous, the RFID-system system is qualified to be half-duplex (HDX). The latter requires that the tag comprises a means to store electric energy temporarily. Various ways to transfer information between tag and reader via an electromagnetic field or wave are known.

For the cases this invention relates to, the electromagnetic field is alternating and the information transferred is contained in its modulated instantaneous amplitude, instantaneous frequency or instantaneous phase and speaks of respectively amplitude-modulation (AM), frequency-modulation (FM) or phase-modulation (PM). Accordingly, then electromagnetic field is subject to one of amplitude-shift-keying modulation (ASK), frequency-shift-keying keying modulation (FSK) or phase-shift-keying modulation (PSK).

For example in the case of a FDX RFID-system, the tag transfers in uplink information to the reader by modulating in time the amount of power it absorbs from the electromagnetic field or wave generated by the reader. The tag does so by modulating the load it presents to the electromagnetic field which leads to a corresponding variation of instantaneous amplitude of the electromagnetic field that may be detected by the reader. This method is called load-modulation. Known to the person skilled in art are tags operating with electromagnetic fields or waves having a frequency in the LF-band (low frequency) e.g. at 125 kHz, in the HF-band (high frequency) e.g. at 13.56 MHz or in the UHF-band (ultra-high frequency) e.g. at 868 MHz.

RFID tags may comprise at least one integrated circuit (referred to as integrated tag-circuit) having at least two terminals and an antenna having at least two terminals each connected electrically and joint mechanically to exactly one of the two terminals of the integrated tag-circuit and vice-versa. Said antenna may be a passive device i.e. without innate source of energy, capable to produce an electrical signal on its two terminals carried by a voltage and a current when interacting with a surrounding electromagnetic field. The integrated tag-circuit may be composed of a multitude of miniaturized electronic components such as e.g. transistors and resistors obtained by structuring adequately a single piece of monocrystalline semiconductor-material.

Even more specifically, there may be provided a sub-set of the integrated tag-circuit's electronic components called transponder front-end that implements the functions required to exchange information with the electrical signal at the integrated tag-circuit's terminals, i.e. the functions enabling communication with a reader in up- and downlink. The transponder front-end is typically implemented by analog circuitry. The integrated tag-circuit of a passive LF-tag typically comprises as sub-circuits a ground-generator providing a node with the integrated tag-circuit's reference-potential, a rectifier generating a direct voltage from the alternating voltage at the antenna's terminals, a voltage-limiter protecting its two terminals from over-voltage, a regulator generating a stable supply-voltage, a reference-circuit generating reference-voltages and -currents, a transponder front-end and a digital circuit. The transponder front-end receives and demodulates the signal at the antenna's terminals in downlink and modulates the carrier signal at the antenna's terminals with the data-signal provided from the digital circuit in uplink. The digital circuit usually comprises a memory, it decodes and processes the demodulated signal in downlink, generates the signal to be transmit in uplink and provides it to the transponder front-end.

The transponder front-end receives and demodulates the signal at the antenna's terminals, which signal is usually called RF input signal, in downlink and modulates the carrier signal at the antenna's terminals with the data signal provided from the digital circuit in uplink. The digital circuit usually comprises a memory, it decodes and processes the demodulated signal in downlink, generates the signal to be transmit in uplink and provides it to the transponder front-end.

A conventional transponder front-end of a passive LF-tag as known is typically comprises a clock extractor, a modulator and a demodulator. The clock-extractor behaves like a limiting amplifier with hysteresis and provides, if the signal-voltage at the antenna's terminals has sufficient amplitude, a digital clock-signal, used as clock signal for the digital circuit of the integrated tag-circuit, having the same instantaneous frequency than the antenna-signal-voltage.

The function of the modulator is to modulate the amplitude of the signal on the tag coils during uplink communication, i.e. from the tag to the reader. The variation of this voltage induces a variation of the induction field between the reader and the tag and produces a variation of voltage on the reader coils. The reader is able to demodulate the voltage variation on its coils and to decode the tag response.

The function of the demodulator is to provide to the digital circuit of the integrated tag-circuit the demodulated digital signal during down-link by down-converting from radio-frequency to baseband the RF input signal and then converting it from analog to digital signal. Some ASK demodulators demodulate the RF input signal in downlink using an envelope-detector implemented by a diode-rectifier or by a precision-rectifier followed by a continuous-time low-pass filter. The output of the envelope detector is then compared against a fixed voltage reference with a comparator to provide the demodulated signal to the digital circuit.

Other ASK demodulators demodulate the RF input signal in downlink using an envelope-detector implemented by a diode-rectifier or by a precision-rectifier followed by a continuous-time low-pass filter. The output of the envelope detector is then compared against a variable reference voltage with a comparator to provide the demodulated signal to the digital circuit. The variable reference voltage is generated by low-pass filtering with a continuous-time filter, usually named average detector, the envelope detector output.

Others ASK demodulators demodulate the RF input signal in downlink using an envelope-detector implemented by a diode-rectifier or by a precision-rectifier followed by a continuous-time low-pass filter. The output of the envelope detector is the input of a discrete-time differentiator. The differentiator samples the input signal with a sampling frequency equal to the carrier frequency by using the clock output from the clock extractor circuit with the phase eventually controlled by a multi-phase generator, and produces at the output, at every sampling time, the difference between two subsequent input samples. The output of the discrete-time differentiator is then compared against a fixed voltage reference with a comparator to provide the demodulated signal to the digital circuit. The demodulated signal is a measure of the RF input envelop variation rather than its absolute value.

In downlink, the modulator defines the short time-intervals during which the reader may transmit data, usually one data-bit per time-interval, to the tag by lowering the load-impedance during said time-intervals. The reader transmits one binary state by leaving the amplitude of the electromagnetic field it emits unchanged during the time-interval defined by the tag. The reader transmits the other possible binary state by lowering the electromagnetic field that it emits. As the voltage-signal on the tag's antenna has an amplitude already lowered by the action of the tag's modulator, further lowering of the amplitude by the reader upon transmission of the other binary state leads to the resulting antenna-voltage-signal to be too weak such that the clock may not be extracted and the clock-extractor's output is stuck in a fixed state.

The performance of a passive RFID tag is measured in terms of the distance, the tag may be read i.e. the tag correctly receives a message transmit by the reader, transmits back a message in reply and the reader correctly receives said message in reply. The bigger the maximum distance, at which this process works, is, the better is the tag's performance. Said maximum distance is referred to as reading-distance.

The antenna of passive RFID-tags is usually inductive, i.e. it comes in the form of an inductive coil and it interacts essentially with a magnetic field whereas the interaction with an electric field is negligible. Furthermore, the integrated tag-circuit has usually a capacitance connected between its two terminals that constitutes together with the inductance of the antenna a resonant circuit with high a quality-factor.

A high quality-factor of a value of e.g. 40 or even up to 60 is used to generate the maximum voltage-amplitude with the power available from the magnetic field and to be able to supply the integrated tag-circuit through the rectifier. However a high quality-factor equates to a low bandwidth of the tag's antenna. With quality-factors in the range between 40 and 60 and symbol-rates of roughly 4 kBd, the portion of the signal's spectrum carrying the information is significantly attenuated and phase- and amplitude-versus-frequency-characteristic is significantly distorted by the transfer-function of the tag's antenna.

Despite the high quality-factor of the usual antennae of passive RFID-tags, the power consumed in the integrated tag-circuit is still much lower than the power consumed in the resistive losses of the tag's antenna. Consequently, with passive RFID-tags of the state of the art, power-consumption of the integrated tag-circuit is not seriously limiting the tag's performance, i.e. its reading-distance.

A passive RFID-tag's performance may be limited by its sensitivity in downlink i.e. by the transponder front-end's ability to receive and demodulate the signal at the antenna because for sources of error such as noise or imprecision of device-characteristics innate to the integrated tag-circuit. The sensitivity of a tag in downlink is defined to be the weakest signal that it is able to receive and demodulate with a given low rate of errors. Because of the aforementioned attenuation and distortion of the phase- and amplitude-versus-frequency-characteristic of the signal to be received caused by the antenna's transfer-function, the tag's sensitivity in downlink is degraded and the reading-distance is reduced.

A passive LF-FDX-tag's performance may be limited by its transmit-strength in uplink. A passive RFID-tag as known in the prior art may not modulate its load-impedance too strongly such that the amplitude of the antenna-voltage-signal becomes so weak that the clock may not been extracted. If the clock is not extracted any more, the digital part of the integrated tag-circuit is not clocked and will remain in the present state without any means to leave it. This means that load-modulation of known tags in uplink needs to be limited in strength which results in a limitation of the amplitude of the signal received by the reader and thus in a limitation in reading-distance. Such a limitation is as well observed with tags and readers of the state of the art.

The manufacturing cost of an integrated circuit strongly depends on its size. In the case of passive RFID-tags, said size is strongly impacted by the presence of resistors with high resistance in the range of several MΩ. Such high resistance-values are required mainly as the currents consumed have to be restricted to the range of a few nA and as with carrier-frequencies in the range of 100 kHz and symbol-rates in the range of 4 kBd, the transponder front-end's time-constants that are usually implemented by products of a capacitance and a resistance are in the range of several µs and require capacitors and resistors of big size.

It is therefore desirable to improve the sensitivity of an RFID tag in the downlink direction and to improve or to increase an RFID tag's transmit strength in the uplink direction. It is a further aim to enable a further miniaturization of RFID tags and to enable use of rather cost efficient and compact electronic components, such as resistors and capacitors in an analogue front-end of an RFID circuit or RFID transponder.

SUMMARY

In one aspect the invention relates to a demodulator for an RFID circuit. The demodulator comprises an input and at least one output. The demodulator further comprises a clock extractor connected to the input. The demodulator also comprises a comparator connected to the at least one output.

Moreover, the demodulator comprises a finite impulse response (FIR) filter arrangement connected to the input and connected to the comparator. In particular and in some examples the demodulator comprises an analog discrete-time finite impulse response (FIR) filter arrangement connected to the input and connected to the comparator. Compared to known demodulator configurations the FIR filter arrangement may replace a continuous-time low-pass filter followed by a differentiator, or an envelope detector followed by a differentiator, and allows for a rather flexible choice on the equalization of the RF input signal.

The FIR filter arrangement can perform a high-pass filtering and a low-pass filtering. In other words, the FIR filter arrangement is configured to provide a band-pass filter for RF signals present at the input of the demodulator. Moreover, the FIR filter arrangement is configured to provide both, a high-pass filtering and a low-pass filtering in one and the same hardware block. Insofar it is possible to sample and to down-convert directly the RF input signal without the need to use a continuous time low-pass filter or an envelope detector, components that significantly contribute to the geometric size of such demodulators and respective RFID applications.

The FIR filter arrangement is configured to sample directly the RF input signal presumed that the clock extractor provides a respective clock signal or clock phase to the FIR filter arrangement such that the sampling clock edge of the FIR filter arrangement is aligned with a peak of the carrier signal of the RF input signal.

Use of the FIR filter arrangement does not only save space on an RFID chip or RFID circuit. FIR filter arrangements can be implemented on the basis of a switched capacitor technique or switched capacitor technology and are therefore well suited as equalization blocks for RFID passive tag front ends due to their very low power consumption and low-area. Such FIR filter arrangements are commercially available at low cost and are thus very attractive for implementation into an RFID circuit. Typically, a cut-off frequency in a discrete time filter is a function of the clock rate and not of the size of the capacitor. Insofar, a rather low-power consumption of the FIR filter arrangement is a consequence of the low area and/or low capacitance of the components of the FIR filter arrangement.

According to another example the FIR filter arrangement is a discrete time filter arrangement and the FIR filter arrangement is coupled to the clock extractor. The FIR filter arrangement may be directly or indirectly coupled to the clock extractor. In this way, a sampling clock edge of the FIR filter arrangement can be easily aligned with a peak of the carrier signal of the RF input signal.

In a further example, the FIR filter arrangement is a passive discrete time analogue FIR filter arrangement. A passive discrete time analogue FIR filter arrangement is quite attractive for a passive RFID circuit due to its very low power consumption.

In another example the FIR filter arrangement comprises at least one n-tap FIR filter having a number of n-delay lines or a number of n-taps.

The finite impulse response FIR filter provides an impulse response of finite duration. The discrete time FIR is of order n. Each value of an output sequence is a weighted sum of the most recent input values. The peak delay line or tap of the n-tap FIR filter provide a time delayed input to a multiplication operation. Typically, each delay line or tap of the n-tap FIR filter is successively delayed by a clock cycle. For example with three taps or delay lines a second tap or delay line is delayed by the clock cycle from the first tap or delay line. The first tap or delay line is delayed by a clock cycle from the second delay line or second tap.

The number of delay lines or taps as well as their weighting or their factors with regard to the output of the FIR filter arrangement can be individually modified. The specific implementation of the FIR filter arrangement and of the numerous n-tap FIR filters thereof can be individually designed for each demodulator in order to arrive at an optimum demodulator performance at a minimum of geometric space and manufacturing costs.

A single channel n-tap FIR filter can produce an output only at a rate given by the clock frequency divided by the number of delay lines or number of taps. For this it is beneficial when the number of delay lines or number of taps of the n-tap FIR filter is as small as possible. This is also beneficial to arrive at low manufacturing cost, low power consumption and to provide a minimum of geometric space requirements.

In a further example the at least one n-tap FIR filter comprises at least five delay lines or five taps. Simulations and experiments have revealed that a number of at least five taps or delay lines of an n-tap FIR filter is sufficient and/or may represent an optimum for an n-tap FIR filter design.

According to a further example, the number n of taps or delay lines is equal to or smaller than a ratio between a carrier frequency and a modulation frequency of an RF input signal provided at the input of the demodulator.

It has turned out, that the number of taps should be substantially equal to the ratio between the carrier frequency and the modulation frequency. If the carrier frequency is about five times higher compared to the modulation frequency of the RF input signal a number of five delay lines or five taps of the n-tap FIR filter seems to be an optimum. If the ratio between the carrier frequency and the modulation frequency of the RF input signal should be higher than five, e.g. if the ratio should be substantially equal to eight or ten then the respective number n of delay lines or taps of the n-tap FIR filter may be as large as eight or ten for example.

According to another example the at least one n-tap FIR filter comprises five taps or delay lines with each tap or delay line having a filter coefficient $C_i$ with i=0, 1, 2, 3, 4 and wherein the coefficient $C_0$ of the first tap=1 and wherein the coefficient $C_4$ of the last tap=−1. This particular FIR filter implementation has turned out to be of particular benefit in order to provide a suitable and precise demodulation of the RF input signal.

According to a further example residual coefficients $C_1$, $C_2$, $C_3$ of the at least one n-tap FIR filter all equal 0.

With at least one or numerous filter coefficients being equal to 0 the hardware implementation of the at least one n-tap FIR filter can be simplified. Manufacturing costs as well as geometric space for the FIR filter can be thus reduced.

According to another example the at least one n-tap FIR filter comprises numerous switched capacitors. In practice, each delay line or tap comprises four switches and one capacitor. There may be provided two individual switches to connect the capacitor to an input node and to ground, respectively. Closing these switches enables charging of the capacitor, e.g. during a clock cycle. These switches may be denoted as input switches. Moreover, each capacitor may be connected with two output switches by way of which the capacitor can be connected to ground and to an output node of the n-tap FIR filter.

According to another embodiment the FIR filter arrangement comprises numerous n-tap FIR filters. The n-tap FIR filters may be equally configured or may be differently configured. With some embodiments the FIR filter arrangement consists of equally configured n-tap FIR filters. Typically, the number of individual and e.g. identically configured n-tap FIR filters of the FIR filter arrangement equals the number of n-delay lines or n-taps each n-tap FIR filter is made of. For example, an FIR filter arrangement made up of equally configured 5-tap FIR filters comprises five of such 5-tap FIR filters.

Moreover and according to a further example the FIR filter arrangement comprises n times n-tap FIR filters in an interleaved arrangement. With a number of n-tap FIR filters equal to n to make up the FIR filter arrangement the disadvantage that each one of the n-tap FIR filters only provides a new output at the clock cycle divided by n can be compensated. Here, the n-tap FIR filters are driven in an interleaved arrangement. Each n-tap FIR filter may operate or may be driven individually with a predefined delay. Typically, the delay between consecutive n-tap FIR filters of the FIR filter arrangement may equal the clock cycle of the clock signal provided by the clock extractor.

In the interleaved arrangement, wherein each consecutive n-tap FIR filter of the FIR filter arrangement is driven by a delay that equals the clock cycle each one of the n-tap FIR filters of the FIR filter arrangement provides an individual output at a rate of the clock cycle divided by n. Since there are provided n individual n-tap FIR filters that are n-times delayed by a clock cycle the output of the FIR filter arrangement is provided with the clock frequency and hence at every clock cycle the demodulator provides a respective output signal.

With a combination of n positive and/or negative filter coefficients of the single n-tap FIR filters that are time interleaved with a factor of n it is possible to form an n-tap FIR filter arrangement running at the clock rate and offering therefore a greater extent of flexibility in designing the equalization function for an ASK demodulator aimed to improve demodulator sensitivity and therefore the RFID tag's reading-distance performance.

According to a further example the demodulator comprises a multi phase generator connected to the clock extractor and connected to the FIR filter arrangement. The multi phase generator is configured to provide a phase signal for each individual n-tap FIR filter of the FIR filter arrangement at a given delay. The multi phase generator is connected to the clock extractor and is driven by the clock extractor. The multi phase generator is configured to provide a sequence of phase signals to drive the individual n-tap FIR filters of the FIR filter arrangement.

Hence, the multi phase generator is configured to provide a first phase signal to a first n-tap FIR filter of the FIR filter arrangement. The multi phase generator is configured to provide a second phase signal to a second n-tap FIR filter of the FIR filter arrangement at a time delayed by the clock cycle compared to the first phase signal. Moreover, the multi phase generator is configured to generate and to provide respective second, third, fourth, or n-phase signals to the numerous n-tap FIR filters of the FIR filter arrangement, wherein consecutive phase signals are time delayed by the clock cycle or multiples thereof.

According to another example the multi phase generator is individually connected to each n-tap FIR filter of the FIR filter arrangement. In this way, the multi phase generator is configured to individually trigger the switching of the switches of each of the n-tap FIR filter at a given clock cycle.

According to a further example the multi phase generator is configured to provide a first clock signal CS from the clock extractor to a first n-tap filter at a time t1 and the multi phase generator is further configured to provide the first clock signal CS to at least a second n-tap filter at a time t1+a predefined time delay. Here, the time delay is determined by the clock frequency of the clock signal. The time delay may be equal to the clock cycle. Here, the first clock signal CS provided by the clock extractor may be considered as that phase signal for switching the numerous switches of the n-tap FIR filters.

According to another aspect there is provided a transponder front-end for an RFID circuit. The transponder front-end comprises a first antenna node connectable to a first antenna pad and a second antenna node connectable to a second antenna pad. The transponder front-end further comprises a clock-recovery circuit connected to the first antenna node and connected to the second antenna node. The transponder front-end further comprises a modulator connected to the first antenna node and connected to the second antenna node. Finally, the transponder front-end for or of an RFID circuit comprises a demodulator as described above. The demodulator is connected to the first antenna node and to the second antenna node.

In another aspect an RFID circuit is provided. The RFID circuit comprises a digital circuit, an antenna and a transponder front-end as described above and connected to both, the antenna and the digital circuit of the RFID circuit. Typically the RFID circuit is implemented and configured as a passive RFID tag.

BRIEF DESCRIPTION OF THE DRAWINGS

In the following an embodiment of a demodulator of a RFID circuit it is described in more detail, in which.

DETAILED DESCRIPTION

Figure 1:
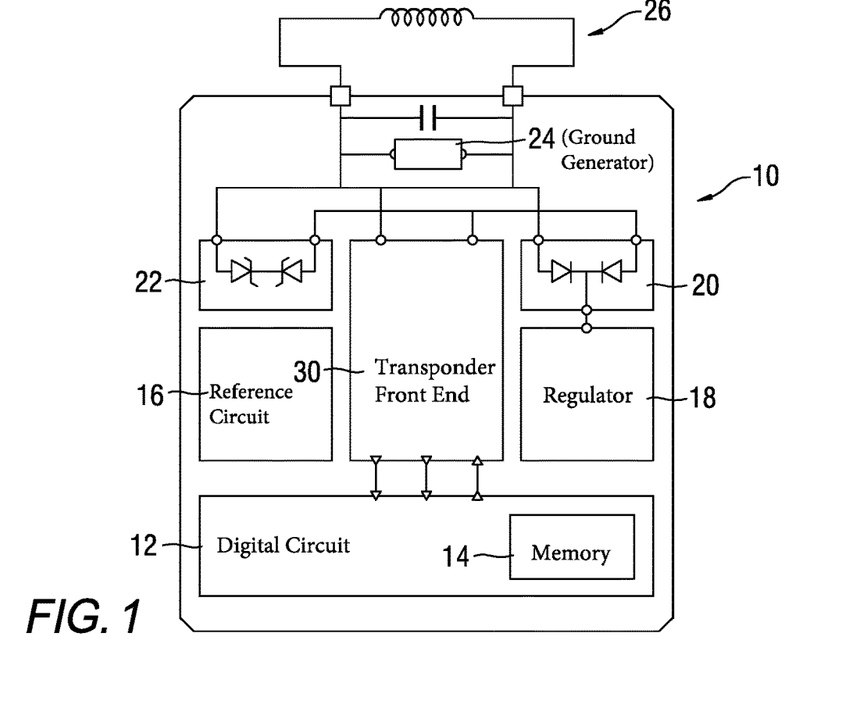
FIG. 1 is a schematic block diagram of the RFID circuit.

FIG. 1 is illustrative of an RFID circuit of an RFID tag according to the present. The RFID circuit 10 comprises an antenna 26, a transponder front-end 30, a digital circuit 12 with a memory 14, a reference circuit 16, a regulator 18, a rectifier 20, a limiter 22 and a ground generator 24. The transponder front-end 30 is a sub-circuit of the integrated tag-circuit 10 that itself is part of an RFID-tag. As shown in more detail in FIG. 2, the transponder front-end 30 comprises a first antenna-pad A1 and a second antenna-pad A2, respectively. The transponder front-end 30 is furthermore provided with at least, as internal nodes, two nodes labelled aa1 and aa2 called first and second antenna nodes. The first antenna node aa1 is connected to the first antenna pad A1 and the second antenna node aa2 is connected to the second antenna pad A2.

Figure 2:
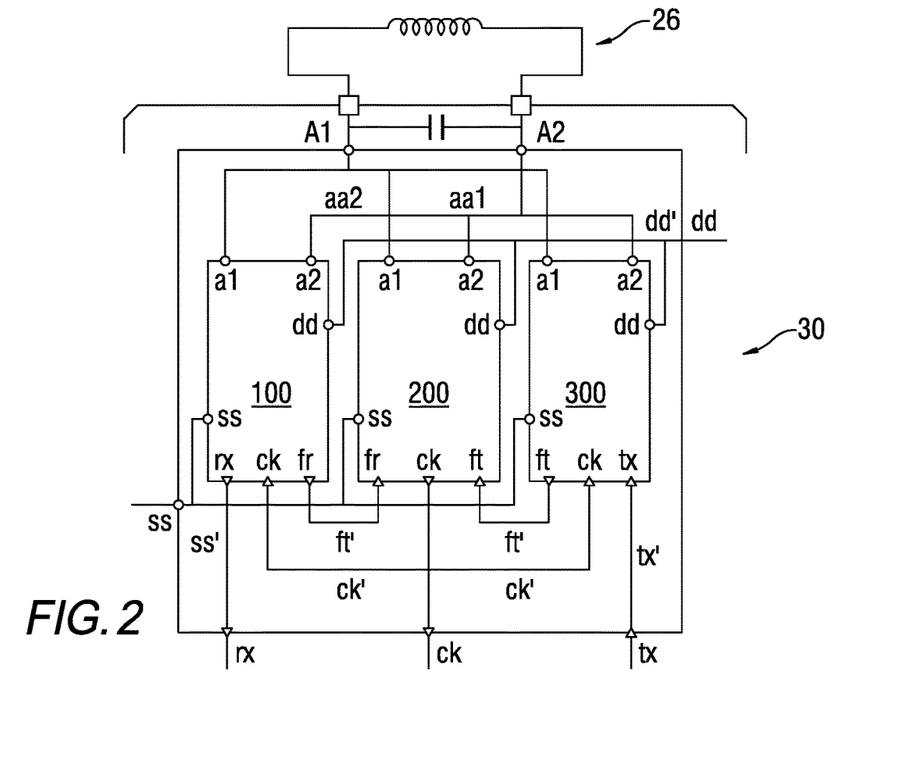
FIG. 2 is a schematic block diagram of the transponder front-end.

The transponder front-end 30 comprises a demodulator 100, a clock recovery circuit 200 and a modulator 300. Both antenna nodes aa1, aa2 are connected to respective first and second antenna pins a1, a2 of the demodulator 100, the clock recovery circuit 200 and the modulator 300, respectively.

The transponder front-end 30 comprises some further pins, namely a transmit pin tx intended to be connected to a node driven by some other sub-circuit of the integrated tag-circuit, a receive pin rx intended to be connected to some node interfacing some other sub-circuit of the integrated tag-circuit, a clock pin ck intended to be connected to some node of the integrated tag-circuit interfacing some other sub-circuits of the integrated tag-circuit, a supply-pin labelled dd and intended to be connected to some node of the integrated tag-circuit carrying the voltage-supply and a ground pin labelled ss and connected to the node of the integrated tag-circuit carrying the reference-potential. The antenna-pads A1, A2 of the integrated tag-circuit are intended to be connected to the terminals of the tag's antenna 26.

The transponder front-end 30 further comprises an internal node labelled tx' and referred to as transmit-node, one further internal node labelled rx' referred to as receive-node, one further internal node labelled ck' referred to as clock-node, one further internal node labelled dd' referred to as supply-node, one further internal node labelled ss' referred to as ground-node, one further internal node labelled fr' referred to as receive-freeze-node and one more internal node labelled ft' and referred to as transmit-freeze-node.

The first antenna node aa1 is connected to the transponder front-end's first antenna pin a1, the second antenna node aa2 is connected to the transponder front-end's second antenna pin a2. The said transmit-node tx' is connected to a transponder front-end's transmit pin tx. The receive-node rx' is connected to a transponder front-end's receive pin rx. The clock-node is connected to a transponder front-end's clock pin. The supply-node dd' is connected to a transponder front-end's supply-pin dd and the ground-node ss' is connected to the transponder front-end's ground pin ss.

The modulator 300 has an electrical interface of at least two antenna pins labelled a1 and a2 referred to as first and second antenna pin and connected to the antenna nodes aa1 and aa2 respectively. The modulator 300 has one further pin labelled tx referred to as transmit pin and connected to the transponder front-end's transmit-node tx'. The modulator 300 comprises one further pin labelled ck referred to as clock pin and connected to the clock-node ck'. The modulator 300 comprises one further pin labelled ft referred to as transmit freeze pin and connected to the transmit-freeze-node ft'. The modulator 300 comprises one further pin labelled dd referred to as supply-pin and connected the supply-node dd'. The modulator 300 comprises one more pin labelled ss referred to as ground pin and connected to the ground-node ss'.

The demodulator 100 of the transponder front-end 30 comprises an electrical interface of at least the two pins labelled a1 and a2 and referred to as first and second antenna pins and connected to the antenna nodes aa1 and aa2, respectively. The demodulator 100 comprises one further pin labelled rx referred to as receive pin and connected to the receive-node rx'. The demodulator 100 comprises one further pin labelled ck referred to as clock pin and connected the clock-node ck'. The demodulator 100 comprises one further pin labelled fr referred to as receive freeze pin and connected to the receive-freeze-node fr'. The demodulator 100 comprises one further pin labelled dd referred to as supply-pin and connected to the supply-node dd'. The demodulator 100 comprises one more pin labelled ss referred to as ground pin and connected to the ground-node ss'.

The transponder front-end 30 also comprises the clock recovery circuit 200 as a sub-circuit. The clock recovery circuit 200 comprises an electrical interface of at least two pins labelled a1 and a2 and referred to as first and second antenna pins and connected to the antenna nodes aa1 and aa2, respectively. The clock recovery circuit 200 comprises one further pin labelled ck referred to as clock pin and connected to the clock-node ck'. The clock recovery circuit 200 comprises one further pin labelled ft referred to as transmit freeze pin and connected to the transmit-freeze-node ft'. The clock recovery circuit 200 comprises one further pin labelled fr referred to as receive freeze pin and connected to the receive-freeze-node fr'. The clock recovery circuit 200 comprises one further pin labelled dd referred to as supply-pin and connected to the supply-node rx'. The clock recovery circuit 200 comprises one more pin labelled ss referred to as ground pin and connected to the ground-node ss'.

The function of the modulator 300 is to modulate the amplitude of the signal on the tag coils during uplink communication, e.g. from a tag to a reader. Due to the mutual inductance between the reader coils and the tag coils the variation of this signal and hence of the voltage induces a variation of the induction field between the reader and the tag and produces a variation of voltage on the reader coils. The reader is able to demodulate the voltage variation on its coils and to decode the tag response. The modulator principle is based on the modulation of the impedance at the tag coils input.

The function of the demodulator 100 is to extract the modulation signal sent by the reader received on the tag coils during downlink transmission. The demodulator principle is optimized for space and area reduction and performances. The entire system and hence the demodulator is not working in continuous time but is sampled. The sampling frequency is equal to the carrier frequency Fc. So the circuit is sampled every Tc=(1/Fc). Instead of comparing the absolute value of the envelope with its average or with a fix threshold, the demodulator circuit 100 detects the variation of the envelope itself. Here, three different cases are conceivable.

In a first case the envelope level decreases from a first time t1 to a second time t1+Tc. In this case the output of the demodulator changes from logical '1' to logical '0'. In a second case the envelope level increases from a first time t1 to the second time t1 +Tc. Then, the demodulator changes from logical '0' to logical '1'. In a third case, wherein the envelope level does not change from the first time t1 to a second time t1+Tc the demodulator output is memorized.

Figure 3:
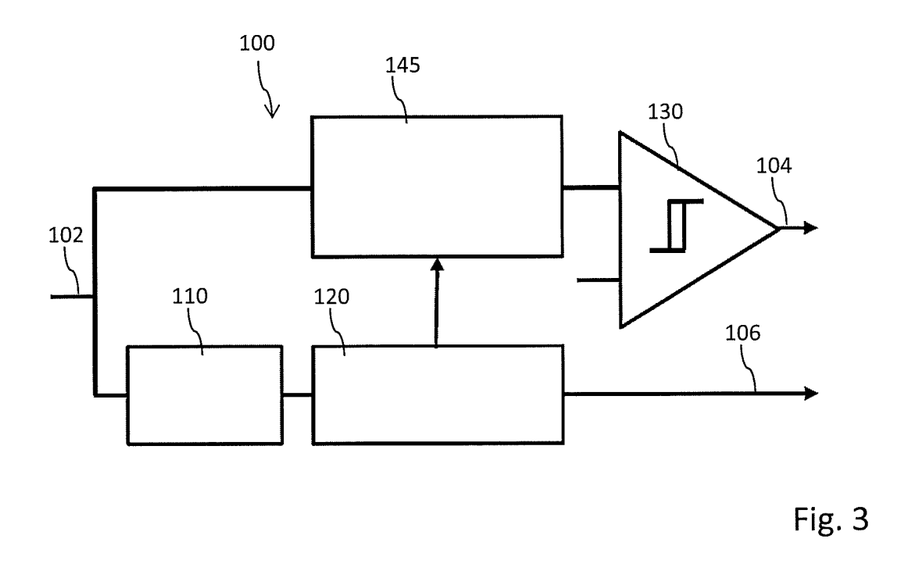
FIG. 3 is a schematic block diagram of the demodulator of the transponder front-end.

The demodulator 100 of the RFID circuit 10 as illustrated in FIG. 3 comprises an input 102, i.e. in form of two antenna nodes a1, a2 and further comprises at least one output 104, 106. The demodulator 100 comprises a comparator 130 and an FIR filter arrangement 145. The FIR filter arrangement 145 and the comparator 130 are arranged in series. An input of the FIR filter arrangement 145 is directly connected to the input 102 of the demodulator 100. An output of the FIR filter arrangement 145 is connected to a first input of the comparator 130. The comparator 130 comprises a second input connected to a reference, e.g. a voltage reference. The comparator 130 comprises an output 104 configured to provide data to a digital demodulator.

The demodulator is generally not limited to the RFID circuit as shown in FIGS. 1 and 2 but can be used with many other RFID circuits as well.

The demodulator 100 further comprises a clock extractor 110 and a multi phase generator 120. The clock extractor 110 and the multi phase generator 120 are arranged in series. An input of the clock extractor 110 is connected to the input 102. The clock extractor 110 and the multi phase generator 120 are arranged parallel to the FIR filter arrangement 145 and the comparator 130. The multi phase generator comprises a first output connected to the FIR filter arrangement 145. The multi phase generator 120 comprises a second output 106 forming a second output of the demodulator 100. The output 106 is configured to provide a clock signal to a digital demodulator.

By means of the FIR filter arrangement 145 the variation of the envelope of the RF input signal can be measured so as to create a voltage at the first input of the comparator 130 that is proportional to the variation of the RF input signal. The comparator 130 is configured to compare the output of the FIR filter arrangement 145 with a fixed reference to generate an output signal or a data output.

Figure 5:
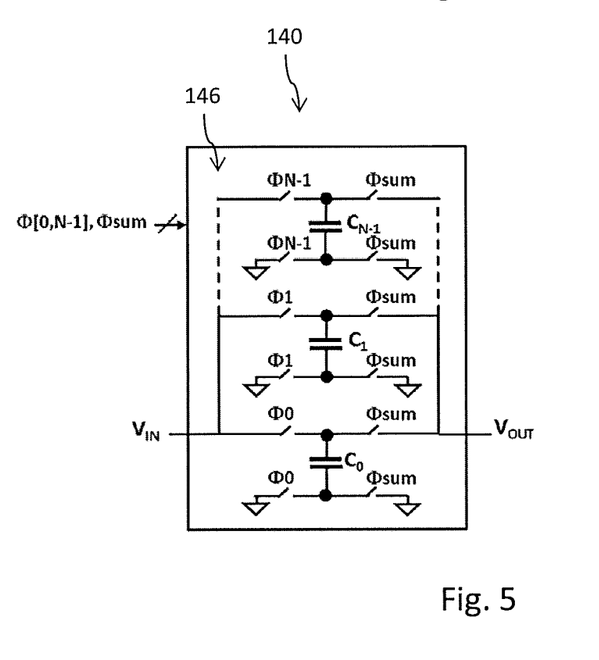
FIG. 5 is a schematic illustration of a switched capacitor implementation of the FIR filter.
Figure 7:
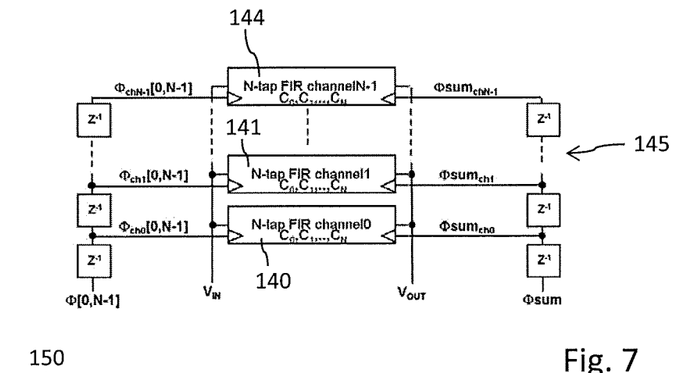
FIG. 7 is a schematic illustration of numerous FIR filters in an interleaved configuration.
Figure 9:
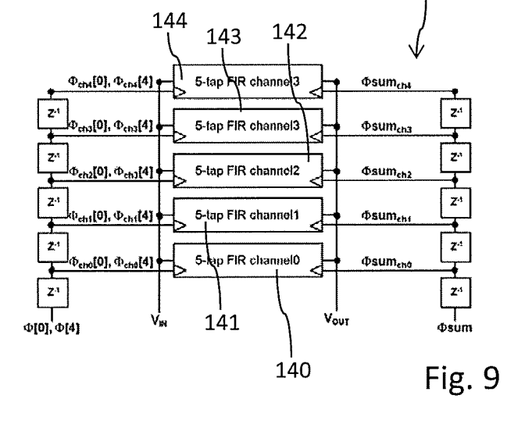
FIG. 9 is a schematic illustration of five FIR filters in an interleaved configuration.

The FIR filter arrangement is implemented as a passive, discrete time n-tap passive FIR filter arrangement. The FIR filter arrangement 145 comprises numerous individual n-tap FIR filters 140, 141, 142, 143, 144 as schematically illustrated in FIGS. 7 and 9. The n-tap filters 140, 141, 142, 143, 144 may be arranged in parallel. As shown in FIG. 5, each n-tap FIR filter 140 comprises an input connectable to $V_{in}$ and hence to the input 102. The FIR filter 140 further comprises an output connected to $V_{out}$ and is hence connected to the first input of the comparator 130. The numerous FIR filters 140, 141, 142, 143, 144 are individually connected to the multi phase generator 120. They are driven in an interleaved mode. With the example of FIG. 9, wherein the FIR filter arrangement 145 comprises five individual n-tap FIR filters 140, 141, 142, 143, 144 each one of the n-tap FIR filters 140, 141, 142, 143, 144 is delayed to a neighboring filter 140, 141, 142, 143, 144 in the time domain by a clock cycle.

For instance, the n-tap FIR filter 141 is delayed by a clock cycle compared to the n-tap FIR filter 140. The n-tap FIR filter 142 is delayed with regard to the n-tap FIR filter 141 by a clock cycle and so on. The number of n-tap FIR filters of the FIR filter arrangement 145 equals the number n of delay lines or the number n of taps of the individual n-tap FIR filters. If the n-tap FIR filter comprises for instance five taps or delay lines there are provided five individual five-tap FIR filters 140, 141, 142, 143, 144 in the FIR filter arrangement 145.

Figure 4:
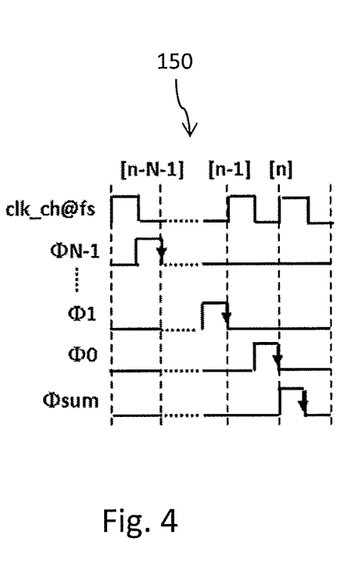
FIG. 4 is illustrative of a delayed clock input and the various taps of the FIR filter.

In FIGS. 4 and 5 a switched capacitor implementation of a single n-tap FIR filter 140 is schematically illustrated. The FIR filter 140 comprises an input $V_{in}$ and an output $V_{out}$. The FIR filter 140 comprises numerous condensators $C_0$, $C_1$ and $C_{N-1}$, and hence a total number of up to N condensators. The condensators are arranged in parallel. Each condensator has a first node connectable to ground and has a second node connectable to $V_{in}$ and $V_{out}$ respectively. Each delay line or tap of the n-tap FIR filter 140 comprises one condensator and four switches altogether. Each tap comprises two input switches $\Phi_0$ and two output switches $\Phi_{sum}$.

By closing the input switches $\Phi_0$ the first condensator $C_0$ will be charged during a first clock cycle. Thereafter and during a second clock cycle a second condensator will be charged while the first condensator will be disconnected from the input $V_{in}$. After n clock cycles each one of the available capacitors will be charged. After N clock cycles the output switches $\Phi_{SUM}$ will be closed thus discharging all capacitors to generate a signal at the output $V_{out}$.

Figure 8:
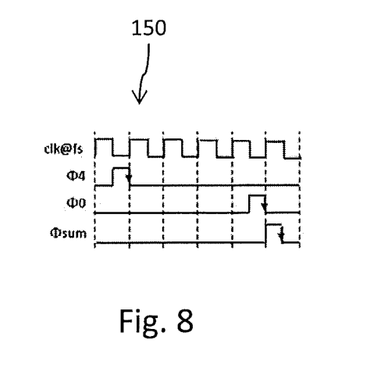
FIG. 8 is a schematic illustration of a delayed clock input for a 5 tap FIR filter.

The phase diagrams 150 of FIGS. 4 and 8 illustrate the temporal behavior of the on and off phases of the individual switches $\Phi_0$ to $\Phi_{N-1}$ over time and the switching of the output switches $\Phi_{sum}$.

The capacitance of the individual capacitors $C_0$, ... $C_{N-1}$ defines so called FIR filter coefficients. In the switched capacitor implementation 146 of the FIR filter 140 as illustrated in FIG. 5 all FIR coefficients are positive.

Figure 6:
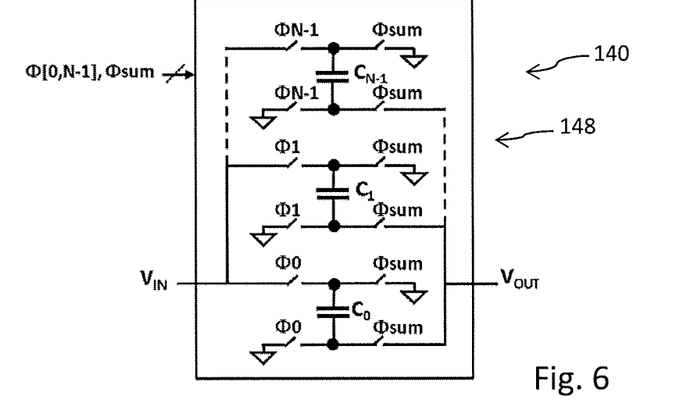
FIG. 6 is another schematic illustration of a switched capacitor implementation of the FIR filter.

Contrary to the switched capacitor implementation 146 of FIG. 5, the configuration of FIG. 6 represents a switched capacitor implementation 148 with negative FIR coefficients. There, the output $V_{out}$ is connectable via the output switches $\Phi_{sum}$ to a first node of the capacitors $C_0$, ..., $C_{n-1}$. A second node of the capacitors $C_0$, ..., $C_{n-1}$ is connected via the input switches $\Phi_0$, ..., $\Phi_{n-1}$ to the input $V_{in}$.

With the positive FIR filter coefficient implementation as illustrated in FIG. 5 $V_{in}$ and $V_{out}$ are connected to one and the same node of the capacitors. With the negative FIR coefficient implementation as shown in FIG. 6 the input $V_{in}$ and the output $V_{out}$ are connected to different nodes of the capacitors $C_0$, ..., $C_{n-1}$.

Figure 10:
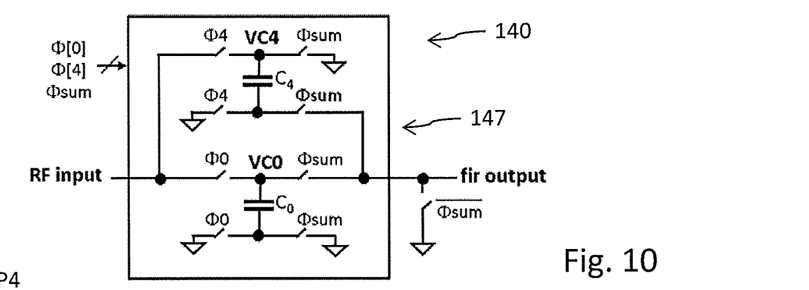
FIG. 10 represents a specific switched capacitor implementation of a FIR filter.

In FIGS. 8 and 10 a specific implementation of an FIR filter 140 is illustrated. Here, the FIR filter 140 comprises five taps or five delay lines with filter coefficients $C_0=1$ and $C_4=-1$ with residual filter coefficients $C_1$, $C_2$, and $C_3$ equal to 0. Here, the first delay line or tap of the FIR filter 140 is provided with a positive filter coefficient $C_0$ and the last, hence the fifth delay line or tap is provided with a negative filter coefficient. Residual or other filter coefficients equal 0. Consequently, the switch capacitor implementation 147 of the respective FIR filter 140 only comprises two capacitors $C_0$, $C_4$ and respective input and output switches.

As illustrated in FIG. 10, a first node of the first capacitor $C_0$ is connectable to ground via an input switch $\Phi_0$ and $\Phi_{sum}$, respectively. A second node of the first capacitor $C_0$ is connectable to the RF input via the input switch $\Phi_0$. The second node of the first capacitor $C_0$ is connectable to the filter output FIR output via the output switch $\Phi_{sum}$. Here, the switched capacitor implementation of the first capacitor $C_0$ corresponds to the switched capacitor implementation 146 as illustrated in FIG. 5. The other capacitor $C_4$ of the switched capacitor implementation 147 is implemented to comprise a negative FIR coefficient. Accordingly, the first node of the capacitor $C_4$ is connectable via the input switch $\Phi_4$ to ground and via a further output switch $\Phi_{sum}$ to the FIR output. A second node of the capacitor $C_4$ is connectable via another input switch $\Phi_4$ to the RF input and to ground via another output switch $\Phi_{sum}$.

As illustrated by the corresponding phase diagram 150 as shown in FIG. 8 the input switches $\Phi_4$ are closed during a first clock cycle. During a subsequent second clock cycle, during a subsequent third clock cycle and during a subsequent fourth clock cycle none of the switches $\Phi_0$, $\Phi_4$ is closed. These switches remain open. During a fifth clock cycle the input switches $\Phi_0$ are closed and the capacitor $Z_0$ will be charged. Thereafter all output switches $\Phi_{sum}$ are closed in order to provide an output signal at and after the fifth clock cycle.

With a single five-tap FIR filter 140, 141, 142, 143, 144 an output signal is provided at a reduced rate. Only every fifth clock cycle there will be provided a filtered signal at the output 104. In order to provide a signal at each clock cycle the FIR filter arrangement 145 comprises five n-tap filters 140, 141, 142, 143, 144 that are arranged and driven in an interleaved mode by the multi phase generator 120. Such an interleaved arrangement is illustrated in FIGS. 7 and 9. FIG. 7 represents a general interleaved arrangement of N individual n-tap FIR filters 140, . . . , 144. The block diagram of FIG. 9 represents an interleaved arrangement of five five-tap FIR filters 140, 141, 142, 143, 144 in the interleaved arrangement.

Figure 11:
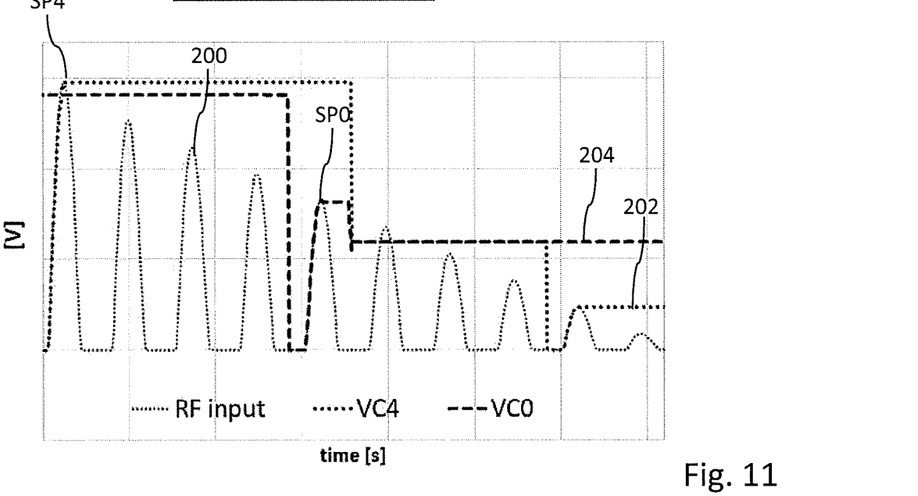
FIG. 11 represents a single channel FIR waveform diagram versus RF input of the FIR filter according to FIG. 10.
Figure 12:
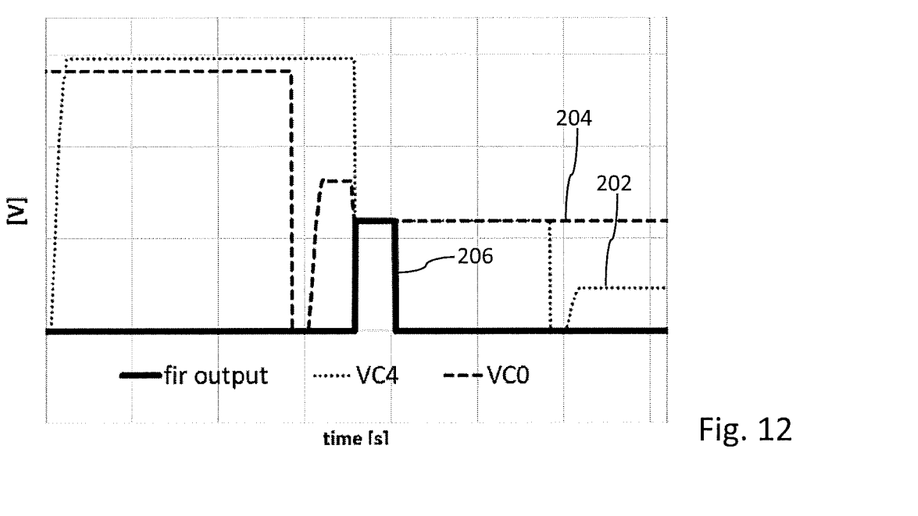
FIG. 12 shows a single channel FIR waveform diagram versus FIR output

In FIGS. 11 and 12 the single channel FIR waveforms are illustrated. In FIG. 11 a RF input 200 is illustrated as a dashed line. The voltage VC4 at the condensator $C_4$ of the switched capacitor implementation 147 of FIG. 10 is illustrated by a bold dotted line 202 and the voltage VC0 provided at the capacitor $C_0$ is illustrated in a bold dashed line over time 204. As illustrated in FIG. 11 the sampling of the condensator $C_4$ starts at the first clock cycle. The respective point SP4 is indicated in FIG. 11. After the fifth clock cycle the sampling of the condensator $C_0$ starts as indicated by sampling point SP0.

In FIG. 12 the waveforms 202, 204 are voltage signals present at the capacitors $C_4$, $C_0$. They are again illustrated as waveforms 202, 204 respectively. In addition, the finite impulse response, hence the FIR output 206 is illustrated as a bold line. It provides a pulse of finite duration after or during the fifth clock cycle.

Figure 13:
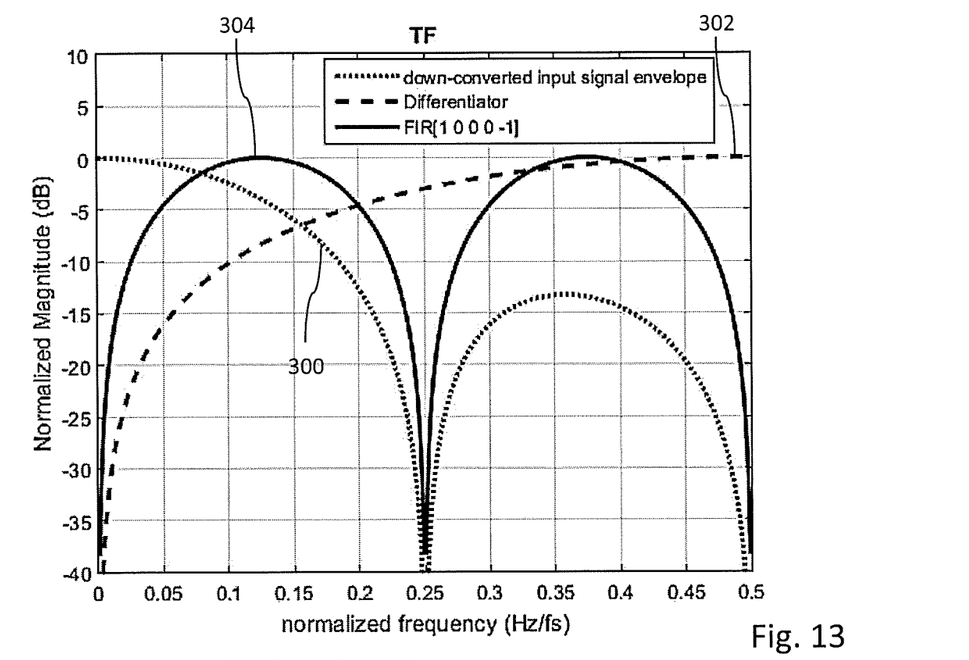
FIG. 13 shows a normalized transfer function of the FIR filter and FIG. 14 shows the RF input versus the filtered output and the respective demodulator front-end output data.

In FIG. 13, a simulation of a transfer function of a FIR filter arrangement 145 comprising five n-tap interleaved FIR filters is illustrated. A dotted line 300 represents the normalized envelope magnitude of the down-converted input signal with Fcarrier/Fmodulation=4 over normalized frequency. The dash dotted line 302 shows a comparable output transfer function if the demodulator 100 were implemented by means of a differentiator, hence by a 2-tap FIR filter with $c_0=1$ and $c_1=-1$. The bold line 304 represents the output transfer function of the present 5-tap FIR filter arrangement 145. As illustrated the FIR filter arrangement 145 comprises a shape in the frequency domain that is somewhat equivalent to the down-converted input signal. Hence, the FIR filter arrangement 145 provides a rather precise and exact signal conversion. The further dash-dotted line 308 represents an output of a 4-tap FIR filter with filter coefficients $c_{0,1,2,3}=1$.

With the presently illustrated example the FIR filter arrangement is a band-bass filter combining the attenuation of the DC signal scope of the differentiator with the attenuation of the noise at half of the clock frequency (FS/2). The present choice of N-tap=5 is optimal for a signal with a ratio of the carrier frequency divided by the modualtion frequency Fcarrier/Fmod=4, since it minimizes the attenuation of the signal spectrum. Here, a notch of the filter at FS/4 corresponds to the notch of the down-converted signal.

In FIG. 13 the spectrum of a periodic modulating signal 306 is illustrated, which may represent a possible signal in the ASK modulation for the RFID chip. Due to the minimum 4 time unit duration of the 0 the notch of the down-converted signal appears at FS/4. The 5-tap filter in this specific case is the preferred choice.

Regarding the DC of the down-converted signal in the prior art it has been a common scope to attenuate it, e.g. with a differentiator, since it varies with the tag to reader distance and making the result of the demodulation dependent on it. The noise components at FS/2 are the most critical once since they are contributing to sample-to-sample noise, which is an unwanted variation between one signal sample and the following. Without the low-pass filtering this sample-to-sample noise would increase the error rate of the demodulator.

Figure 14:
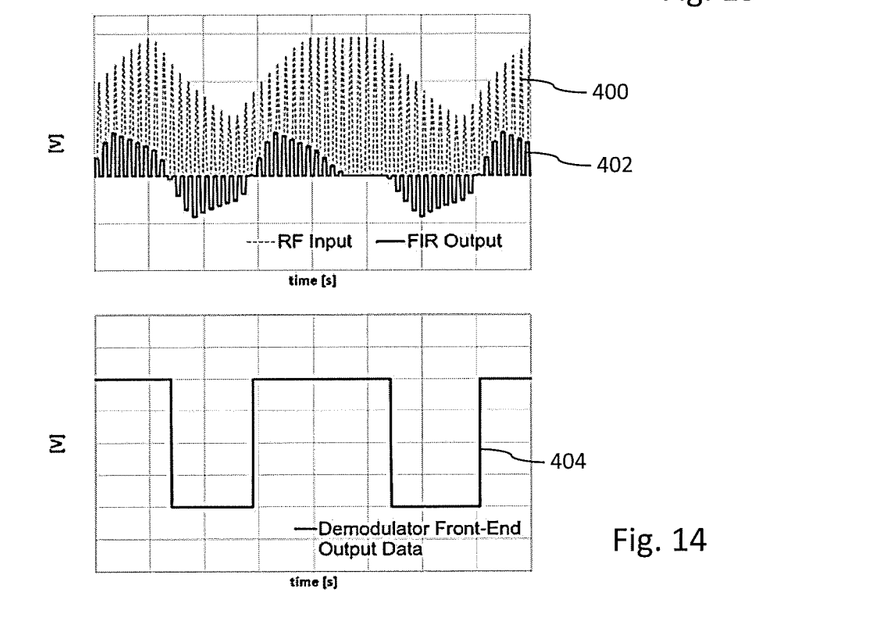

In FIG. 14, the RF input 400 is shown in the time domain in comparison to the output 402 of the FIR filter arrangement 145. As the derivative of the envelope of the RF input 400 changes sign, the FIR output 402 switches from positive values to negative values. Accordingly and in the lower diagram 404 of FIG. 14 the demodulator front end output data as provided at the output of the comparator 130 is illustrated in the time domain. As shown there in comparison to the envelope of the RF input 400 the demodulator front and output data changes as the derivative of the envelope of the RF input is subject to a change.

LIST OF REFERENCE NUMERALS

10 RFID circuit
12 digital circuit
14 memory
16 reference circuit
18 regulator
20 rectifier
22 limiter
24 ground generator
26 antenna
30 transponder front-end
100 demodulator
102 input
104 data output
106 clock output
110 clock extractor
120 multi phase generator
130 comparator
140 FIR filter
141 FIR filter
142 FIR filter
143 FIR filter
144 FIR filter
145 FIR filter arrangement
146 switched capacitor implementation
147 switched capacitor implementation
148 switched capacitor implementation
150 input phase diagram
200 RF input signal
202 voltage waveform
204 voltage waveform
206 FIR output
300 down-converted input signal envelope
302 comparative differentiator output
304 FIR filter output
306 periodic signal
308 FIR filter output
400 RF input
402 FIR output
404 demodulator front end output data
SP0 sampling point
SP4 sampling point
a1, a2 antenna pin
aa1, aa2 antenna node
A1, A2 antenna pad
ss ground pin
ss' ground-node dd supply pin
dd' supply-node
cke clock extraction pin
cke' clock-extraction-node
ck clock pin
ck' clock node
ckf fed-back clock pin
ckf' fed-back clock-node
fc frequency control pin
fc' frequency-control-node
ft transmit freeze pin
ft' transmit-freeze-node
fr receive freeze pin
fr' receive-freeze-node

The invention claimed is:

1. A demodulator for an RFID circuit, the demodulator comprising:
an input and at least one output,
a clock extractor connected to the input,
a comparator connected to at least one output, and
a finite-impulse response (FIR) filter directly connected between the input and the comparator,
wherein the FIR filter is a discrete-time filter.

2. The demodulator according to claim 1, wherein the FIR filter comprises at least one n-tap FIR filter having a number of n delay lines or a number of n taps.

3. The demodulator according to claim 2, wherein at least one n-tap FIR filter comprises at least 5 delay lines or taps.

4. The demodulator according to claim 2, wherein the number n of taps or delay lines is equal to or smaller than a ratio between a carrier frequency and a modulation frequency of a RF input signal provided at the input.

5. The demodulator according to claim 2, wherein at least one n-tap FIR filter comprises five taps, with each tap having a filter coefficient $c_i$, with i=0, 1, 2, 3, or 4, wherein the coefficient $c_0$ of the first tap equals 1 and wherein the coefficient $c_4$ of the last tap equals −1.

6. The demodulator according to claim 5, wherein residual coefficients $c_1$, $c_2$, $c_3$ of the at least one n-tap FIR filter equal 0.

7. The demodulator according to claim 2, wherein at least one n-tap FIR filter comprises numerous switched capacitors ($C_0$, $C_1$, $C_2$, $C_3$, $C_4$).

8. The demodulator according to claim 1, wherein the FIR filter comprises a number of n n-tap FIR filters in an interleaved arrangement.

9. The demodulator according to claim 8, further comprising a multi-phase generator connected to the clock extractor and connected to the FIR filter.

10. The demodulator according to claim 9, wherein the multi-phase generator is individually connected to each n-tap FIR filter of the FIR filter.

11. The demodulator according to claim 9, wherein the multi-phase generator is configured to provide a first clock signal from the clock extractor to a first n-tap filter at a time $t_1$, and the multi-phase generator is further configured to provide the first clock signal to at least a second n-tap filter at a time $t_1$ plus a predefined time delay, wherein the time delay is determined by the clock frequency of the clock signal.

12. The demodulator of claim 1, wherein the FIR filter is coupled to the clock extractor.

13. A transponder front-end for an RFID circuit, the transponder front-end comprising:
a first antenna node connectable to a first antenna pad,
a second antenna node connectable to a second antenna pad,
a clock recovery circuit connected to the first antenna node and to the second antenna node,
a modulator connected to the first antenna node and to the second antenna node, and
the demodulator according to claim 1, the demodulator being connected to the first antenna node and to the second antenna node.

14. An RFID circuit, comprising:
a digital circuit,
an antenna, and
the transponder front-end according to claim 13, the transponder front-end being connected to the digital circuit and to the antenna.

15. A demodulator for an RFID circuit, the demodulator comprising:
an input and at least one output,
a clock extractor connected to the input,
a comparator connected to at least one output, and
a finite-impulse response (FIR) filter connected to the input and connected to the comparator,
wherein the FIR filter is a discrete-time filter, and the FIR filter is coupled to the clock extractor.

16. A transponder front-end for an RFID circuit, the transponder front-end comprising:
a first antenna node connectable to a first antenna pad,
a second antenna node connectable to a second antenna pad,
a clock recovery circuit connected to the first antenna node and to the second antenna node,
a modulator connected to the first antenna node and to the second antenna node, and
a demodulator connected to the first antenna node and to the second antenna node, wherein the demodulator includes
an input and at least one output,
a clock extractor connected to the input,
a comparator connected to at least one output,
a finite-impulse response (FIR) filter connected to the input and connected to the comparator.

* * * * *